United States Patent

Kamitani et al.

[11] Patent Number: 5,948,220
[45] Date of Patent: Sep. 7, 1999

[54] PRODUCTION SYSTEM OF ELECTROLYZED WATER

[75] Inventors: Yoshinori Kamitani, Nagoya; Takeaki Funabashi, Toyoake, both of Japan

[73] Assignee: Hoshizaki Denki Kabushiki Kaisha, Toyoake, Japan

[21] Appl. No.: 09/031,912

[22] Filed: Feb. 27, 1998

[51] Int. Cl.[6] .................................................. B23H 3/02
[52] U.S. Cl. ................... 204/228.2; 204/228.1; 204/228.6; 204/229.8; 204/230.2; 204/237; 204/242
[58] Field of Search ............... 204/228.1, 228.2, 204/228.6, 229.4, 229.8, 230.2, 232, 237, 242

[56] References Cited

U.S. PATENT DOCUMENTS

| | | | |
|---|---|---|---|
| 5,624,535 | 4/1997 | Tsuchikawa et al. | 204/228.2 |
| 5,643,425 | 7/1997 | Amano et al. | 204/279 |
| 5,728,274 | 3/1998 | Kamitani et al. | 204/229.6 |
| 5,792,343 | 8/1998 | Fujita et al. | 204/228.2 |
| 5,798,028 | 8/1998 | Tsuchikawa et al. | 204/228.2 |

OTHER PUBLICATIONS

Abstract of Japanese Patent Publ. No. 07060254A; dated Mar. 7, 1995.
Abstract of Japanese Patent Publ. No. 06335686A; dated Dec. 6, 1994.

*Primary Examiner*—Bruce F. Bell
*Attorney, Agent, or Firm*—Nikaido, Marmelstein, Murray & Oram LLP

[57] ABSTRACT

A production system of electrolyzed water of the type which includes a first brine tank arranged to store an amount of saturated brine, a second brine tank arranged to be supplied with the saturated brine from the first brine tank through an electrically operated pinch valve and fresh water from an external source of water through an electrically operated water supply valve for storing an amount of diluted brine, and an electrolyzer arranged to electrolyze the diluted brine supplied from the second brine tank for production of electrolyzed water. In the production system, there are provided a conductivity sensor for detecting conductivity of the diluted brine in the second brine tank, an ammeter for detecting a direct current applied to the electrolyzer, and an electric controller adapted to control the pinch valve in such a manner that the second brine tank is supplied with the saturated brine from the first brine tank when the conductivity of the diluted brine detected by the sensor becomes lower than a reference value and to correct the reference value in accordance with the direct current detected by the ammeter.

3 Claims, 4 Drawing Sheets

PRODUCTION SYSTEM OF ELECTROLYZED WATER

BACKGROUND OF THE INVENTION

1. Field of the Invention

The present invention relates to a production system of electrolyzed water, and more particularly to a production system of electrolyzed water of the type which includes a first brine tank arranged to store an amount of saturated brine, a second brine tank arranged to store an amount of diluted brine prepared by dilution of the saturated brine supplied from the first brine tank and an electrolyzer for electrolyzing the diluted brine supplied from the second brine tank to produce electrolyzed water.

2. Description of the Prior Art

Disclosed in Japanese Patent Laid-open Publication No. 6(1994)-335685 is a production system of electrolyzed water in which conductivity of diluted brine supplied into an electrolyzer is detected to adjust a temperature or quantity of the diluted brine supplied into the electrolyzer on a basis of the detected conductivity so that concentration of the diluted brine is maintained in a predetermined value for producing electrolyzed water with a desired chemical property in the electrolyzer. There has been also proposed a production system of electrolyzed water in which DC voltage applied to an electrolyzer for electrolysis of diluted brine is adjusted in accordance with conductivity of the diluted brine to produce electrolyzed water with a desired chemical property.

The conductivity of diluted brine is, however, greatly fluctuated due to change of the temperature of diluted brine supplied into the electrolyzer or change of the mineral content in supplied water. For this reason, it is difficult to constantly produce electrolyzed water with a desired chemical property. In addition, change of the DC voltage applied for electrolysis of diluted brine results in damage of the electrodes of the electrolyzer at their surfaces.

SUMMARY OF THE INVENTION

It is, therefore, a primary object of the present invention is to provide a production system capable of producing electrolyzed water with a desired chemical property in a stable condition without any influences caused by change of the temperature of diluted brine supplied into the electrolyzer or change of the mineral content in supplied water.

According to an aspect of the present invention, the object is accomplished by providing a production system of electrolyzed water which comprises a first brine tank arranged to store an amount of saturated brine, a second brine tank arranged to store an amount of diluted brine, water supply means for supplying fresh water into the second brine tank from an external source of water when the level of diluted brine in the second brine tank becomes lower than a predetermined level, a conductivity sensor disposed within the second brine tank for detecting conductivity of the diluted brine in the second brine tank, comparison means for comparing conductivity of the diluted brine detected by the conductivity sensor with a reference value, saturated brine supply means for supplying the saturated brine into the second brine tank from the first brine tank when the conductivity of the diluted brine detected by the conductivity sensor becomes less than the reference value, and an electrolyzer arranged to electrolyze the diluted brine supplied from the second brine tank for production of electrolyzed water. The production system further comprises current detection means for detecting a direct current applied to the electrolyzer for electrolysis of the diluted brine, and correction means for correcting the reference value in accordance with the direct current detected by the current detection means so that electrolyzed water with a desired chemical property is constantly produced by the electrolyzer.

According to another aspect of the present invention, the object is accomplished by providing a production system of electrolyzed water which comprises a first brine tank arranged to store an amount of saturated brine, a second brine tank arranged to store an amount of diluted brine, water supply means for supplying fresh water into the second brine tank from an external source of water when the level of diluted brine in the second brine tank becomes lower than a predetermined level, a conductivity sensor disposed within the second brine tank for detecting conductivity of the diluted brine in the second brine tank, comparison means for comparing conductivity of the diluted brine detected by the conductivity sensor with a reference value, saturated brine supply means for supplying the saturated brine into the second brine tank from the first brine tank when the conductivity of the diluted brine detected by the conductivity sensor becomes less than the reference value, and an electrolyzer arranged to electrolyze the diluted brine supplied from the second brine tank for production of electrolyzed water. The production system further comprises current detection means for detecting a direct current applied to the electrolyzer for electrolysis of the diluted brine, and correction means for correcting the conductivity of the diluted brine detected by the conductivity sensor in accordance with the direct current detected by the current detection means so that electrolyzed water with a desired chemical property is constantly produced by the electrolyzer.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
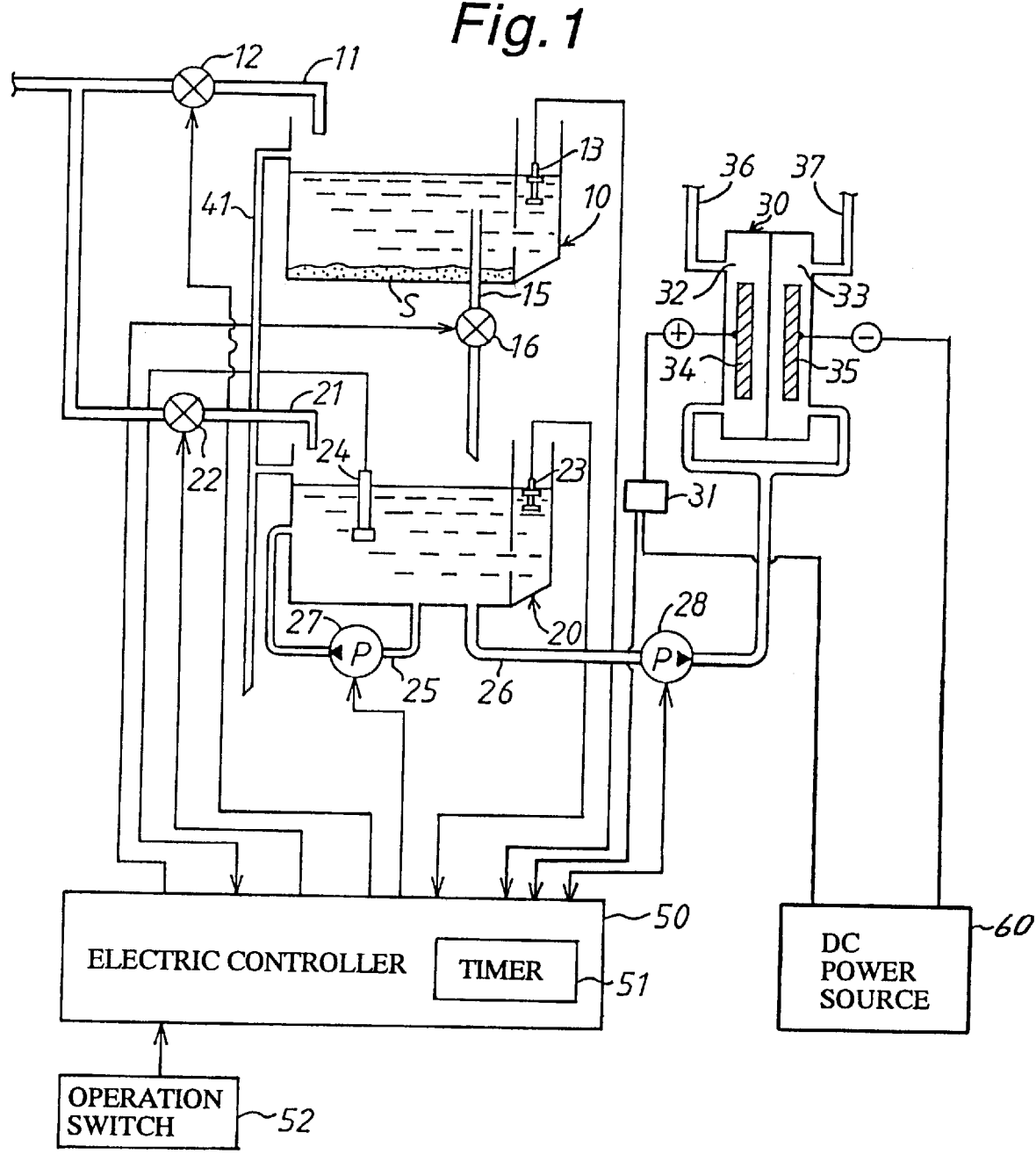
FIG. 1 is a schematic illustration of a production system of electrolyzed water in accordance with the present invention.

In FIG. 1 of the drawings, there is schematically illustrated a preferred embodiment of a production system of electrolyzed water in accordance with the present invention. The production system includes an upper brine tank 10 arranged to store an amount of saturated brine, a lower brine tank 20 arranged to store an amount of diluted brine prepared by dilution of the saturated brine supplied from the upper brine tank 10 through a discharge conduit 15 under control of an electrically operated pinch valve 16, and an electrolyzer 30 for electrolyzing the diluted brine supplied from the lower brine tank 20.

The upper brine tank 10 is supplied with an amount of electrolytic promoter or salt such as sodium chloride, potassium chloride or the like and supplied with fresh water from an external source of water such a source of city service water (not shown) through a water supply conduit 11 under control of an electrically operated water supply valve 12. Thus, the upper brine tank 10 is constantly filled with an amount of saturated brine, while an amount of undissolved salt S precipitates in the bottom of tank 10. The upper brine tank 10 is provided with a liquid-surface level sensor 13 of the float type which is arranged to detect upper and lower limit levels of the saturated brine in tank 10. The pinch valve 16 provided on the discharge conduit 15 is opened under control of an electric controller 50 to supply the saturated brine into the lower brine tank 20 from the upper brine tank 10.

The lower brine tank 20 is supplied with fresh water from the external source of water through a water supply conduit 21 under control of an electrically operated water supply valve 22 to dilute the saturated brine supplied from the upper brine tank 10. The lower brine tank 20 is provided with a liquid-surface level sensor 23 of the float type and a conductivity sensor 24. The liquid-surface level sensor 23 is arranged to detect upper and lower limit levels of the diluted brine stored in tank 20. The conductivity sensor 24 is arranged to detect conductivity C of the diluted brine. Connected to the bottom of lower brine tank 20 are a conduit 25 for stirring the diluted brine and a brine supply conduit 26 for supplying the diluted brine into the electrolyzer 30. The conduit 25 is connected at its other end to a side wall of the lower brine tank 20 and is provided at its intermediate portion with an electrically operated fluid pump 27 which is activated under control of the electric controller 50 to stir the diluted brine in the lower brine tank 20. The brine supply conduit 26 is provided with an electrically operated fluid pump 28 which is activated under control of the electric controller 50 to supply the diluted brine from the lower brine tank 20 into the electrolyzer 30 therethrough. An overflow pipe 41 is connected to the side walls of upper and lower brine tanks 10 and 20, respectively at a position located slightly above each upper limit level detected by the liquid-surface level sensors 13 and 23. When the level of saturated brine in tank 10 or diluted brine in tank 20 rises over the upper limit level, an excessive amount of brine is drained through the overflow pipe 41.

The interior of electrolyzer 30 is subdivided by a cation permeable vertical membrane into electrode chambers 32 and 33. In operation of the fluid pump 28, the electrode chambers 32 and 33 are supplied with the diluted brine from the lower brine tank 20 through the brine supply conduit 26. The electrode chambers 32 and 33 are respectively provided therein with an anode 34 and a cathode 35 which are opposed to each other and connected to a DC power source circuit 60. When the anode 34 is applied with positive DC voltage while the cathode 35 is applied with negative DC voltage, the diluted brine supplied into the electrode chambers 32 and 33 is electrolyzed into acid-ion water and alkaline-ion water. The acid-ion water is discharged from an outlet conduit 36 of the electrode chamber 32, while the alkaline-ion water is discharged from an outlet conduit 37 of the electrode chamber 34. An ammeter 31 is disposed in a current supply line between the DC power source circuit 60 and the anode 34 to detect the direct current applied to the electrodes 34 and 35 for electrolysis of the diluted brine.

In the production system of electrolyzed water, the electric controller 50 is in the form of a microcomputer connected to the liquid-surface level sensors 13, 23, conductivity sensor 24 and ammeter 31. The electric controller 50 is programmed to execute a control program shown by flow charts in FIGS. 2 and 3 for control of the electrically operated valves 12, 16, 22 and fluid pumps 27, 28. In addition, the electric controller 50 is provided with an operation switch 52 for control of activation of the production system.

Figure 2:
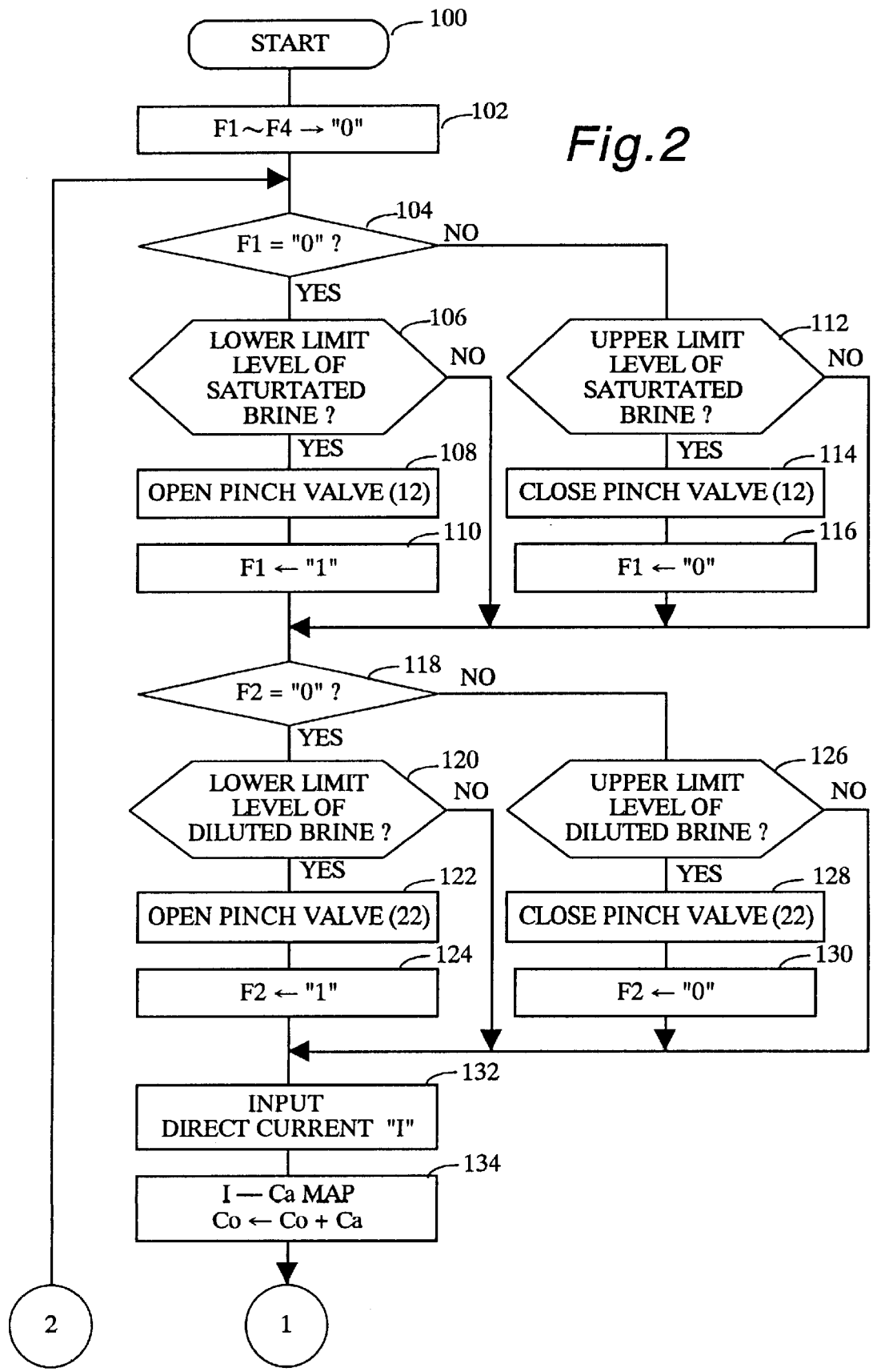
FIGS. 2 and 3 illustrate a flow chart of a control program executed by an electric controller shown in FIG. 1.
Figure 3:
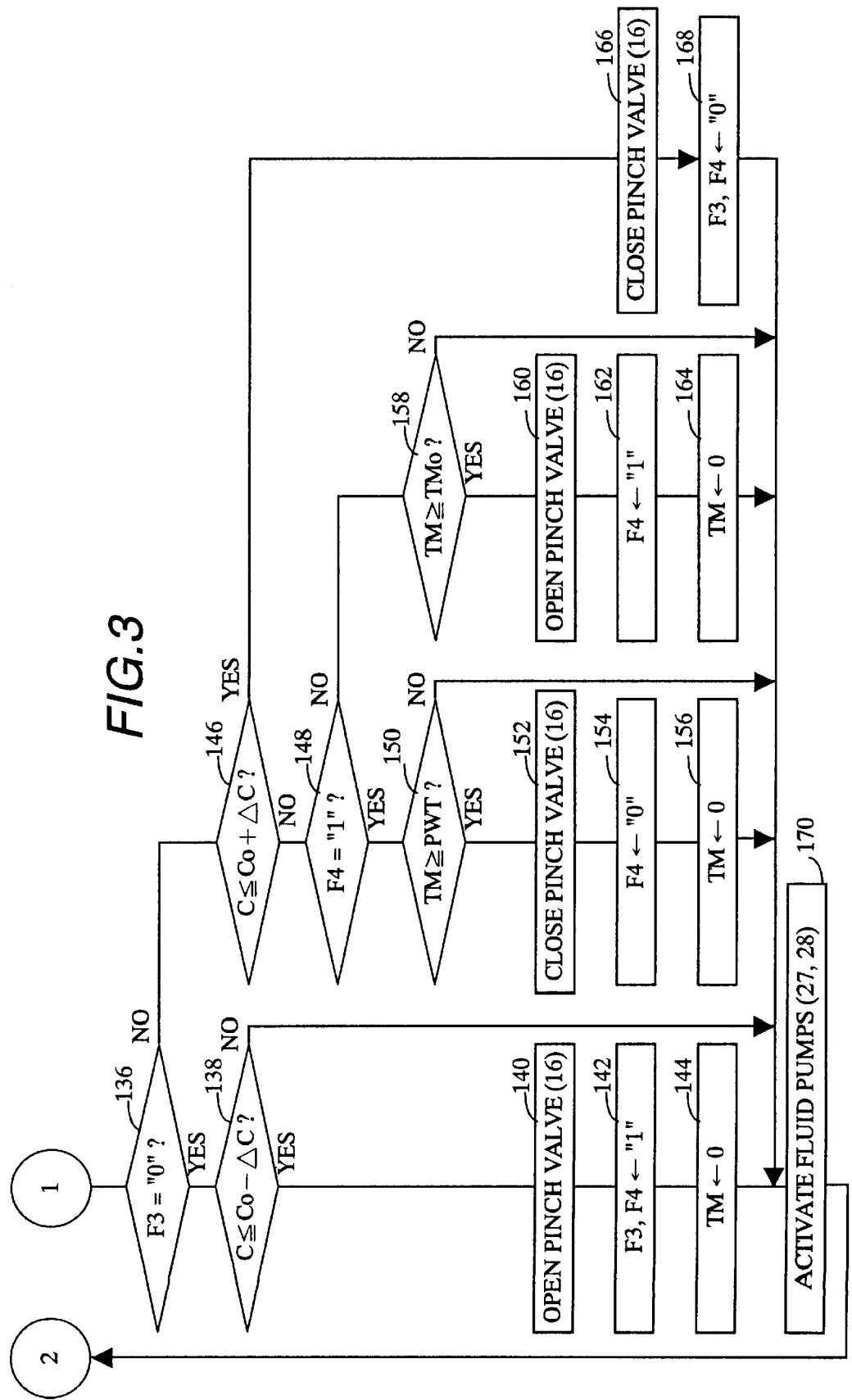

Hereinafter, operation of the production system of electrolyzed water will be described in detail with reference to the flow charts shown in FIGS. 2 and 3. In use of the production system, a large amount of salt such as sodium chloride, potassium chloride or the like is put into the upper brine tank 10 to prepare an amount of saturated brine in a condition where an amount of undissolved salt precipitates in the bottom of tank 10. Assuming that a power source switch (not shown) of the system has been turned on, the electric controller 50 is activated to initiate execution of the control program at step 100 shown in FIG. 2 and initializes flags F1, F2, F3 and F4 each to "0" at step 102. After initialization of the flags F1, F2, F3 and F4, the controller 50 repeats processing at step 104 to 170. The processing at step 104 to 116 is executed to supply fresh water into the upper brine tank 10 from the external source of water. At step 104, the controller 50 determines whether the flag F1 is "0" or not. When the answer at step 104 is "Yes" at the initial stage of operation, the program proceeds to step 106 where the controller 50 is responsive to a detection signal from the liquid-surface level sensor 13 to determine whether the level of saturated brine in tank 10 is lower than the lower limit level or not. If the answer at step 106 is "No", the controller 50 causes the program to proceed to step 118. If the answer at step 106 is "Yes", the controller 50 opens the water supply valve 12 to supply fresh water into the upper brine tank 10 from the external source of water and causes the program to step 118 after setting the flag F1 to "1"0 at step 110.

After processing at step 110, the controller 50 determines a "No" answer at step 104 and causes the program to proceed to step 112. If the level of saturated brine in tank 10 is lower than the upper limit level, the controller 50 determines a "No" answer at step 112 and causes the program to proceed to step 118. In this instance, the water supply valve 12 is maintained in its open position to continue supply of fresh water into the upper brine tank 10 from the external source of water. When the level of saturated brine in tank 10 rises over the upper limit level, the controller 50 determines a "Yes" answer at step 112 and closes the water supply valve 12 at step 114 to interrupt the supply of fresh water into the upper brine tank 10. After processing at step 114, the controller 50 resets the flag F1 to "0" and causes the program to proceed to step 118. Thus, the level of saturated brine in tank 10 is maintained between the upper and lower limit levels by processing at step 104 to 116.

Similarly to the processing at step 104 to 116, processing at step 118 to 130 is executed to supply fresh water into the lower brine tank 20 from the external source of water. That is to say, the controller 50 determines a "Yes" answer at step 118 since the flag F2 is set as "0" at the initial stage of operation When the level of diluted brine in tank 20 is below the lower limit level, the controller 50 determines a "Yes" answer at step 120 and opens the water supply valve 22 in response to a detection signal from the liquid-surface level sensor 23 to supply fresh water into the lower brine tank 20 from the external source of water until the level of diluted brine in tank 20 rises over the upper limit level. As a result, the level of diluted brine in tank 20 is maintained between the upper and lower limit levels.

Figure 4:
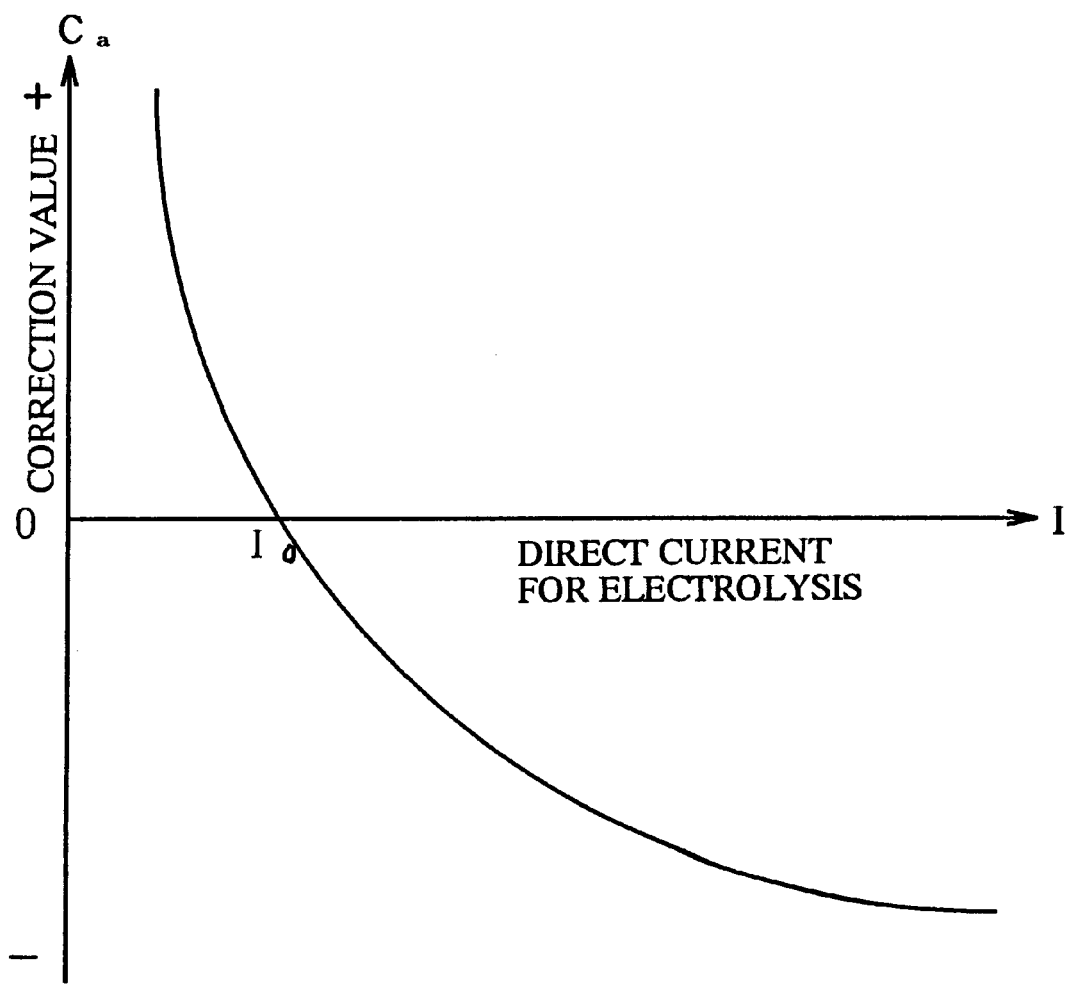
FIG. 4 is a graph showing a correction value Ca in relation to a direct current I applied to an electrolyzer shown in FIG. 1.

After processing at step 118 to 130, the controller 50 reads out at step 132 a direct current I for electrolysis of the diluted brine detected by the ammeter 31 and determines at step 134 a correction value Ca for correction of a reference value Co to a value Co+Ca) in relation to the detected direct current I with reference to an I-Ca map shown in FIG. 4. In this instance, as shown in FIG. 4, the correction value Ca is determined as "Ca–0" when the direct current I is "Io". Thus, the correction value Ca is decreased in accordance with an increase of the detected direct current I and increased in accordance with a decrease of the detected direct current I so that the direct current I for electrolysis of the diluted brine becomes equal to the reference value Co without any influence caused by change of the temperature of diluted brine supplied into the electrolyzer 30 or change of the mineral content in fresh water supplied into the lower brine tank 20 from the external source of water. In other words, the relationship between the direct current I for electrolysis and the correction value Ca is determined to produce electrolyzed water with a desired chemical property without any influence caused by change of the temperature of diluted brine or change of the quality of fresh water supplied into the lower brine tank 20 from the external source of water.

After processing for correction of the reference value Co at step 134, the controller 50 determines at step 136 whether the flag F3 is "0" or not. Since the flag F3 is set as "0" at the initial stage of operation, the controller 50 determines a "Yes" answer at step 136 and causes the program to proceed to step 138. At step 138, the controller 50 determines whether or not conductivity of the diluted brine detected by the conductivity sensor 24 in tank 20 is less than a first comparison value defined by a difference (Co–ΔC) between the reference value Co and a minimal value AC. If the conductivity of the diluted brine is more than the first comparison value, the controller 50 determines a "No" answer at step 138 and causes the program to proceed to step 170.

When the conductivity of the diluted brine becomes less than the first comparison value (Co–ΔC) by processing at step 118 to 130 for supply of fresh water into the lower brine tank 20, the controller 50 determines a "Yes" answer at step 138 and causes the program to proceed to step 140. At step 140, the controller 50 opens the pinch valve 16 to supply the saturated brine into the lower brine tank 20 from the upper brine tank 10 through the discharge conduit 15. After processing at step 140, the controller 50 sets the flags F3 and F4 each to "1" at step 142 and sets a count value TM of the timer 51 to "0" at step 144. Thus, the timer 51 starts to successively increase the count value TM in the course of lapse of a time.

When the processing at step 136 is executed after starting the timer 51, the controller 50 determines a "No" answer at step 136 and causes the program to step 146. At step 146, the controller 50 determines whether or not conductivity C of the diluted brine detected by the conductivity sensor 24 in tank 20 is more than a second comparison value (Co+AC) defined by a sum of the reference value Co and the minimal value C. If the conductivity C of the diluted brine is less than the second comparison value (Co+ΔC), the controller 50 determines a "No" answer at step 146 and determines at step 148 whether the flag F4 is "1" or not. Since the flag F4 is set to "1" by processing at step 142, the controller 50 determines a "Yes" answer at step 148 and causes the program to proceed to step 150. If in this instance, the count value TM does not represent lapse of a predetermined time PWT for maintaining the pinch valve 16 in its open position, the controller 50 determines a "No" answer at step 150 and causes the program to proceed to step 170. Thus, the lower brine tank 20 is continuously supplied with the saturated brine from upper brine tank 10.

When lapse of the predetermined time PWT is measured by the count value TM, the controller 50 determines a "Yes" answer at step 150 and closes the pinch valve 16 to interrupt supply of the saturated brine into the lower brine tank 20 from the upper brine tank 10. After processing at step 152, the controller 50 sets the flag F4 to "0" at step 154 and resets the timer 51 at step 156 to successively increase the count value TM from "0".

When the processing at step 136 is executed after processing at step 156, the controller 50 determines a "No" answer at step 136 and causes the program to proceed to step 146. If the conductivity of the diluted brine does not become more than the second comparison value (Co+ΔC), the controller 50 determines a "No" answer at step 146 and causes the program to proceed to step 148, Since in this instance, the flag F4 is set to "0" by previous processing at step 154, the controller 50 determines a "No" answer at step 148 and causes the program to proceed to step 158. At step 158, the controller 50 determines whether the count value TM is more than a value indicative of a predetermined time TMo or not. If the answer at step 158 is "No", the controller 50 causes the program to proceed to step 170, In such a condition, the pinch valve 16 is maintained in its closed position to interrupt supply of the saturated brine into the lower brine tank 20 from the upper brine tank 10.

When lapse of the predetermined time TMo is measured by the count valve TM, the controller 50 determines a "Yes" answer at step 158 and causes the program to proceed to step 160. At step 160, the controller 50 opens the pinch valve 16 to supply the saturated brine into the lower brine tank 20 from the upper brine tank 10. After processing at step 160, the controller 50 sets the flag F4 to "1" at step 162 and resets the timer 51 to successively increase the count value TM from "0".

When the processing at step 136 is executed after processing at step 160 to 164, the controller 50 determines "No" answer at step 136 and causes the program to proceed to step 146. When the conductivity C of the diluted brine is maintained less than the second comparison value (Co+AC), the controller 50 continuously determines a "No" answer at step 146. Th us, the processing a t step 148 to 164 is repeatedly executed by the controller 50 to open the pinch valve 16 for the predetermined time PWT and to close the pinch valve 16 for the predetermined time TMo. As a result, the lower brine tank 20 is intermittently supplied with a predetermined amount of saturated brine defined by the predetermined time PWT from the upper brine tank 10 to maintain the conductivity C of diluted brine in tank 20 substantially at the reference value Co.

When the conductivity C of the diluted brine becomes more than the second comparison value (Co+aC) as a result of supply of the saturated brine into the lower brine, the controller 50 determines a "Yes" answer at step 146 and causes the program to proceed to step 166. Thus, the controller 50 closes the pinch valve 16 at step 166 to interrupt supply of the saturated brine into the lower brine tank 20 and sets the flags F3, F4 at step 168 to "0" respectively.

After processing at step 136 to 168, the controller 50 controls each operation of the fluid pumps 27 and 28 at step 170 in response to operation of the operation switch 52. When the operation switch 52 is turned on to start production of electrolyzed water, the controller 50 activates the fluid pump 27 to stir the diluted brine in tank 20 and activates the fluid pump 28 to supply the diluted brine from tank 20 into the electrolyzer 30 in a condition where the electrodes 34 and 35 are applied with DC voltage from the DC power source circuit 60. Thus, acid-ion water and alkalineion water produced by electrolysis of the diluted brine in the electrolyzer 30 are discharged from the outlet conduits 36 and 37. When the operation switch 52 is turned off, the controller 50 deactivates the fluid pumps 27 and 28 to stop production of electrolyzed water in the electrolyzer 30.

As is understood from the above description, when the conductivity C of diluter brine is decreased less than the reference value Co due to supply of fresh water into the lower brine tank 20, the pinch valve 16 is opened by processing at step 136 to 168 to intermittently supply the predetermined amount of saturated brine into the lower brine tank 20 from the upper brine tank 10. During supply of the saturated brine into the lower brine tank 20, the controller 50 executes the processing at step 132 to 134 for correction of the reference value Co. In this instance, the reference value Co is adjusted to a lower value if the direct current I for electrolysis detected by ammeter 31 is large and is adjusted to a higher value if the direct current I for electrolysis is small. Such adjustment of the reference value Co is useful to constantly produce electrolyzed water with a desired chemical property in a stable condition without any influence caused by change of the temperature of diluted brine supplied to the electrolyzer 30 or change of the mineral content of fresh water supplied into the lower brine tank 20.

Although in the embodiment described above, the reference value Co of diluted brine has been adjusted in accordance with the magnitude of direct current I detected by ammeter 31, the conductivity C of diluted brine in tank 20 may be adjusted in accordance with the magnitude of direct current I. In such a case, the controller 50 is programmed to read out the direct current I detected by ammeter 31 at step 132 and to determine the correction value Ca in relation to the detected direct current I with reference to the I-Ca map shown in FIG. 4 for correction of the conductivity C of diluted brine to a value (C−Ca).

The above embodiment may be further modified as follows:
   a) The pinch valve 16 may be replaced with an electrically operated fluid pump for supply of the saturated brine into the lower brine tank 20 from the upper bring tank.
   b) The water supply valve 22 may be opened for a predetermined time under control of the controller 50 to supply fresh water from the external source of Water when the level of diluted brine in tank 20 has dropped below the lower limit level.
   c) A water supply valve of the ball-tap type may be adapted to supply a predetermined amount of fresh water into the lower brine tank when the level of diluted brine in tank 20 has dropped below the lower limit level.
   d) The upper brine tank 10 may be supplied with fresh water in an appropriate manner when the shortage of saturated brine has been visually recognized.

What is claimed is:
1. A production system of electrolyzed water, comprising:
   a first brine tank arranged to store an amount of saturated brine;
   a second brine tank arranged to store an amount of diluted brine;
   water supply means for supplying fresh water into said second brine tank from an external source of water when the level of diluted brine in said second brine tank becomes lower than a predetermined level;
   conductivity detection means disposed within said second brine tank for detecting conductivity of the diluted brine in said second brine tank;
   comparison means for comparing the conductivity of diluted brine detected by said conductivity detection means with a reference value;
   saturated brine supply means for supplying the saturated brine into said second brine tank from said first brine tank when the conductivity of the diluted brine detected by said conductivity detection means becomes less than the reference value; and
   an electrolyzer arranged to electrolyze the diluted brine supplied from said second brine tank for production of electrolyzed water;
   wherein the production system further comprises:
      current detection means for detecting a direct current applied to said electrolyzer for electrolysis of the diluted brine; and
      correction means for correcting the reference value in accordance with the direct current detected by said current detection means so that electrolyzed water with a desired chemical property is constantly produced by said electrolyzer.

2. A production system of electrolyzed water, comprising:
   a first brine tank arranged to store an amount of saturated brine;
   a second brine tank arranged to store an amount of diluted brine;
   water supply means for supplying fresh water into said second brine tank from an external source of water when the level of diluted brine in said second brine tank becomes lower than a predetermined level;
   conductivity detection means disposed within said second brine tank for detecting conductivity of the diluted brine in said second brine tank;
   comparison means for comparing the conductivity of diluted brine detected by said conductivity detection means with a reference value;
   saturated brine supply means for supplying the saturated brine into said second brine tank from said first brine tank when the conductivity of the diluted brine detected by said conductivity detection means becomes less than the reference value; and
   an electrolyzer arranged to electrolyze the diluted brine supplied from said second brine tank for production of electrolyzed water;
   wherein the production system further comprises:
      current detection means for detecting a direct current applied to said electrolyzer for electrolysis of the diluted brine; and
      correction means for correcting the conductivity of diluted brine detected by said conductivity detection means in accordance with the direct current detected by said current detection means so that electrolyzed water with a desired chemical property is constantly produced by said electrolyzer.

3. A production system of electrolyzed water, comprising:
   a brine tank arranged to store an amount of diluted brine in an extent of predetermined concentration;
   an electrolyzer arranged to electrolyze the diluted brine supplied from said brine tank for production of electrolyzed water;
   detection means for detecting conductivity of the diluted brine in said brine tank;
   comparison means for comparing the conductivity of diluted brine detected by said detection means with a reference value; and means for adjusting concentration of the diluted brine in said brine tank to a value in the extent of predetermined concentration when the conductivity of diluted brine detected by said detection means becomes less than the reference value;

wherein the production system further comprises:

current detection means for detecting a direct current applied to said electrolyzer for electrolysis of the diluted brine; and correction means for correcting either one of the reference value and the conductivity of diluted brine detected by said detection means in accordance with the direct current detected by said current detection means so that electrolyzed water with a desired chemical property is constantly produced by said electrolyzer.

* * * * *